(12) United States Patent
Coile et al.

(10) Patent No.: US 8,225,013 B2
(45) Date of Patent: Jul. 17, 2012

(54) GENERATION OF A FORMATTED UNIQUE DEVICE IDENTIFIER FROM AN AT ATTACHMENT SERIAL NUMBER

(75) Inventors: Brantley Coile, Athens, GA (US); Samuel Hopkins, Colbert, GA (US)

(73) Assignee: Coraid, Inc., Redwood City, CA (US)

( * ) Notice: Subject to any disclaimer, the term of this patent is extended or adjusted under 35 U.S.C. 154(b) by 0 days.

(21) Appl. No.: 13/026,985

(22) Filed: Feb. 14, 2011

(65) Prior Publication Data

US 2011/0219151 A1 Sep. 8, 2011

Related U.S. Application Data

(60) Provisional application No. 61/310,688, filed on Mar. 4, 2010.

(51) Int. Cl.
*G06F 3/00* (2006.01)
(52) U.S. Cl. .............................. 710/30; 710/9
(58) Field of Classification Search .............. 710/30; 711/200
See application file for complete search history.

(56) References Cited

U.S. PATENT DOCUMENTS

| | | | |
|---|---|---|---|
| 7,502,840 B1* | 3/2009 | Bakke | 709/222 |
| 7,506,078 B2* | 3/2009 | Wootten et al. | 710/15 |
| 7,953,827 B2* | 5/2011 | Roscoe et al. | 709/220 |
| 2002/0087727 A1* | 7/2002 | Tawil et al. | 709/245 |
| 2004/0221049 A1 | 11/2004 | Blumeanu et al. | |
| 2005/0021757 A1* | 1/2005 | Helliwell | 709/226 |
| 2006/0274753 A1* | 12/2006 | Park et al. | 370/392 |
| 2008/0243938 A1 | 10/2008 | Kottomtharayil et al. | |
| 2008/0263089 A1 | 10/2008 | Cousins | |
| 2009/0094500 A1* | 4/2009 | Swekel | 714/752 |

OTHER PUBLICATIONS

PCT International Search Report and Written Opinion, PCT/US2011/024937, Apr. 20, 2011, 7 Pages.

* cited by examiner

*Primary Examiner* — Elias Mamo
(74) *Attorney, Agent, or Firm* — Fenwick & West LLP

(57) ABSTRACT

A Network Address Authority ("NAA") identifier associated with a storage device is generated from an Advanced Technology Attachment ("ATA") serial number, or other identifier, associated with the storage device. The ATA serial number is received from the storage device and used to generate a unique string having a predefined length. In one embodiment, a hash function is applied to the ATA serial number to produce a unique value from the ATA serial number and a portion of the unique value, such as the least significant three bytes, is used as the string having the predefined length. Additional identifying data is combined with the predefined length string and reformatted to generate the NAA identifier. For example, an eight-byte data packet including a four-bit type identifier, a three-byte OUI and the three-byte predefined length string is generated and subsequently used to identify the storage device to processes or devices.

21 Claims, 2 Drawing Sheets

GENERATION OF A FORMATTED UNIQUE DEVICE IDENTIFIER FROM AN AT ATTACHMENT SERIAL NUMBER

CROSS-REFERENCE TO RELATED APPLICATIONS

This application claims the benefit of U.S. Provisional Application No. 61/310,688, filed Mar. 4, 2010, the content of which is incorporated by reference herein in its entirety.

BACKGROUND OF THE INVENTION

1. Field of the Invention

The present invention relates to generating an identifier having a specified format and uniquely identifying a storage device from data associated with a storage device but having a different format.

2. Description of the Related Arts

Computing devices or computing systems conventionally use a bus, such as a peripheral bus, to couple a processor to other devices such as storage devices, network controllers, input devices or output devices. The bus communicates data and/or commands between the processor and other devices coupled to the bus. In different computing devices, different command formats may be used to communicate with devices attached to the bus. For example, when accessing a hard disk, commands may be formatted using the AT Attachment ("ATA") standard or Small Computer System Interface ("SCSI") standard.

Commonly, multiple devices are attached to the bus, so each device is generally associated with a unique identifier, allowing the processor or another device to use the unique identifier to access a particular device. However, generation of such a unique identifier is dependent on characteristics of the device for which the unique identifier is generated. For example, a device using the SCSI standard is generally associated with a unique identifier having a specified format that is assigned by the device manufacturer. For example, a SCSI device includes a unique identifier that is an 8-byte value derived from a 3-byte Organizationally Unique Identifier ("OUI") that is obtained from the Institute of Electrical and Electronics Engineers ("IEEE") Registration Authority. The OUI is subsequently included in the 8-byte unique identifier to uniquely identify the device vendor or manufacturer. The remaining 5 bytes of the unique identifier allow the manufacturer or vendor to assign a globally unique identifier to a particular device. Hence, upon receiving a SCSI formatted identification command, the unique identifier is communicated from the device to the processor.

However, computing devices may include devices designed according to standards other than SCSI. These non-SCSI devices are frequently associated with identifiers having a different format than the SCSI-compliant unique identifiers described above. The different formatting between SCSI devices and other devices makes it difficult for a processor to efficiently communicate with multiple devices each associated with a different standard. For example, Serial Advanced Technology Attachment ("SATA") storage devices are frequently used in computing devices due to their lower cost. Unlike SCSI devices, SATA storage devices do not frequently include an 8-byte unique identifier, making it difficult for a process executed by a processor and using an 8-byte unique identifier, or other specified identifier format, to identify and communicate with a SATA storage device.

However, SATA devices include a manufacturer-assigned ASCII identification string which includes a vendor identifier, a disk type identifier and an ATA serial number. However, this ASCII identification string may have a different format than the identifier format used by an executing process to uniquely identify devices, preventing unique identification of a SATA device by the executing process. For example, an executing process may use the SCSI standard for data communication with devices, so the executing process uses an 8-byte unique identifier, or another identifier having a specified format, to exchange data with a device. However, because the ASCII identification string and ATA serial number included in the SATA device have a different format, they cannot be used by the executing process to uniquely identify the SATA device.

SUMMARY OF THE INVENTION

Embodiments of the present invention include a method for generating an identifier which uniquely identifies a device, such as a storage device, and has a specified format. In one embodiment, the identifier having the specified format is generated from data associated with the device but having a first format that differs from the specified format. For example, an AT Attachment ("ATA") serial number associated with a storage device is used to generate a Network Address Authority ("NAA") identifier which uniquely identifies the storage device to a process or computing device which uses the Small Computer System Interface ("SCSI") protocol, or a similar protocol, to identify and access the storage device.

In one embodiment, an identifier having a first format, which differs from the specified format of the identifier uniquely identifying a storage device, is received from the storage device, or other device. For example, a computing device transmits an identification request to the storage device through a network and receives, via the network, an identifier having a first format that is associated with the storage device, such as an ATA serial number associated with the storage device. From the identifier having the first format, the computing device generates a data string having a predefined length and a unique value from the identifier having the first format. The predefined length of the generated string depends on the specified format. For example, the specified format of the generated identifier is determined by, or is dependent on, the process, application or operating system using the generated identifier to identify and/or communicate with the storage device. In an application where the specified format is the Institute of Electrical and Electronics Engineers ("IEEE") Extended Network Address Authority ("NAA") identifier, the generated data string has a predefined length of three bytes, while in applications where a different specified format is used, the predefined length of the data string differs. In one embodiment, a hash function is applied to the identifier having the first format to generate a unique value which forms the basis of the data string having the predefined length.

Additional identification data is then combined with the data string based on the specified format associated with the identifier being generated. For example, data describing the identifier type and data identifying a vendor or service provider generating the identifier having the specified format are combined with the predefined length string. The additional identification data and predefined length string are then reformatted based on one or more formatting parameters associated with the specified format. For example, if the NAA format is associated with the generated identifier, the additional identification data and predefined length string are reformatted into a packet where a three-bit sequence describes the identifier type, a twenty-four-bit sequence identifies a vendor, service provider or other organization and a three-byte sequence includes the predefined length string. The reformatted additional data and generated string are subsequently stored in a computer-readable storage medium to allow a process executed by a processor or a computing device to communicate with the storage device using identifier uniquely identifying a storage device and having the specified format.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying Figures. It is noted that wherever practicable similar or like reference numbers may be used in the Figures and may indicate similar or like functionality. The Figures depict embodiments of the present invention for purposes of illustration only. One skilled in the art will readily recognize from the following description that alternative embodiments of the structures and methods illustrated herein may be employed without departing from the principles of the invention described herein.

Example System Overview

Figure 1:
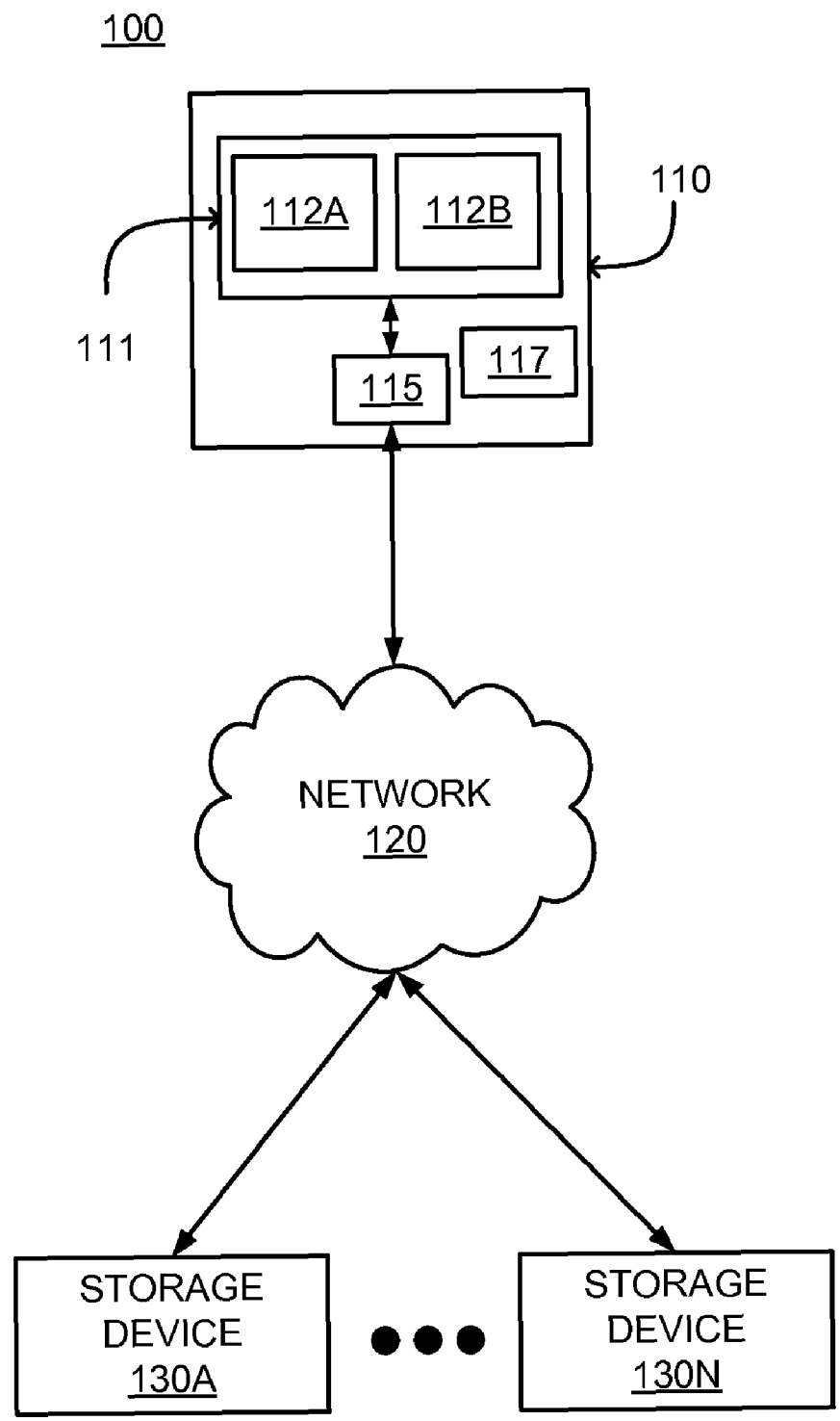
FIG. 1 is a block diagram of a system in which a unique identifier having a specified format and identifying a storage device is generated according to one embodiment.

FIG. 1 shows a block diagram of one embodiment of a system 100 in which a unique identifier having a specified format is generated to identify a storage device. The system 100 includes a computing device 110, a network 120 and one or more storage devices 130A, 130N. For purposes of illustration, FIG. 1 shows a system 100 including two storage devices 130A, 130N, although in other embodiments the system 100 may include more or fewer storage devices 130.

The computing device 110 includes a processor 111, a storage device controller 115 and a memory 117. The processor 111 performs one or more processes 112A, 112B by executing instructions or other executable code from the memory 117 or from a storage device 130. The processes 112 read data from the memory 117 or from the storage device 130 or write data to the memory 117 or to the storage device 130. For purposes of illustration, FIG. 1 shows two processes 112A, 112B performed by the processor 110, although in other embodiments a greater or lesser number of processes 112 are performed by the processor 111. Examples of processes 112 include applications, operating systems, and virtual machines. The memory 117 comprises a non-persistent storage device such as dynamic random access memory (DRAM), static random access memory (SRAM) or similar storage device. In one embodiment, the memory 117 also includes a persistent storage device such as flash memory or a magnetic computer storage device.

The storage device controller 115 communicates data between the computing device 110 and one or more storage devices 130 via the network 120. In one embodiment, the storage device controller 115 includes a memory having instructions or other executable code that, when executed by the processor 111, exchanges data between a process 112 executed by the processor 111 and one or more storage devices 130. For example, the storage device controller 115 transmits read requests to a storage device 130 to retrieve data from the storage device 130 or transmits write requests to a storage device 130 to store data in the storage device 130. To exchange data between more than one storage device 130A, 130N and the computing device 110, the storage device controller 115 uses a unique identifier associated with each storage device 130A, 130N. For example, the memory included in the storage device controller 115 includes unique identifiers associated with each storage device 130.

In one embodiment, the storage device controller 115 uses an identifier associated with a storage device 130 having a first format to identify and exchange data with various storage devices 130. The protocol or standard used by the storage device controller 115 determines the first format of the identifier associated with a storage device 130 by the storage device controller 115. For example, the storage device controller 115 uses the AT Attachment over Ethernet ("AoE") protocol to communicate with a storage device 130, so the storage device controller 115 associates a Media Access Control ("MAC") with each storage device 130. Alternatively, the storage device controller 115 associates a two-byte major address and a one-byte minor address with each storage device 130 for unique identification.

Additionally, the one or more processes 112 performed by the processor 111 also associate unique, process-specific identifiers with each storage device 130 to identify each storage device 130A, 130N. In one embodiment, the process-specific identifier has a specified format which differs from the identifiers associated with the storage devices 130A, 130N by the storage device controller 115. For example, a process 112 associates an identifier having a Network Address Authority ("NAA") format with a storage device 130A while the storage controller 115 associates an identifier having a format used by the AoE protocol, such as a MAC address or major address and minor address, with the storage device 130A.

In one embodiment, data included in the storage device 130 is used by the storage device controller 115 to produce the identifier having the first format. However, a storage device 130 included in the system may not include data suitable for generation of an identifier having the specific format used for a process-specific identifier. For example, a Serial Advanced Technology Attachment ("SATA") storage device 130 includes an ATA serial number which is formatted so that it is unable to be used as an identifier having a Network Address Authority ("NAA") format. To allow a process 112 using an NAA formatted identifier to identify and communicate with a SATA storage device 130, the storage device controller 115 generates an NAA formatted identifier uniquely identifying the SATA storage device 130 from the ATA serial number included in the SATA storage device 130, as described below in conjunction with FIG. 2. This beneficially allows use of SATA storage devices 130 in the system 100 while allowing the processor 111 to execute processes which use different formats for identifying storage devices 130.

The network 120 comprises any combination of local area and/or wide area packet-switched networks. The network 120 may use wired communication methods, wireless communication methods or a combination of wired and wireless communication methods to transmit data and/or instructions between the computing device 110 and one or more storage devices 130A, 130N. For example, responsive to receiving a request from a process 112A to access a storage device 130A, the storage device controller 115 generates one or more data packets using the AoE protocol and transmits the packets to the storage device 130A via the network 120. Based on the contents of the packets, the storage device 130A stores or retrieves data and transmits an acknowledgement message and/or data to the storage device controller 115 through the network 120.

The network 120 and storage device controller 115 allow one or more processes 112 to operate as if the storage devices 130A, 130N are locally attached to the processor 111, when the storage devices 130A, 130N are physically remote from the computing device 110. In one embodiment, the network 120 functions as a dedicated storage area network ("SAN") which communicates data between a computing device 110 and one or more storage devices 130A, 130N, but does not communicate data between different types of devices. Alternatively, the network 120 communicates data between the storage devices 130A, 130N and the computing device 110 as well as data between the computing device 110 and other devices, such as other computing devices, so that the network 120 operates as a SAN and as a file sharing network.

The storage devices 130A, 130N comprise non-volatile storage devices, such as hard disk drives, which exchange data with the computing device 110 via the network 120. Each storage device 130A, 130N is associated with a unique identifier. For example, the storage devices 130A, 130N are Serial Advanced Technology Attachment ("SATA") devices each including an ASCII identification string. In one embodiment, the ASCII identification string includes a vendor identifier, a disk type identifier and an ATA serial number. However, when the storage devices 130 comprise SATA devices, the storage devices 130 do not include data suitable for use as a unique identifier having a different specified format, such as data suitable for use as an NAA identifier, impairing the ability of a process 112 using an NAA identifier to identify a storage device 130 to access a SATA storage device 130.

To enable a process 112 using a specified format other than a SATA identifier, such as an NAA identifier, to identify a storage device 130 having a SATA identification string, the storage device controller 115 generates an NAA identifier associated with the storage device 130 from the SATA identification string. For example, the storage device controller uses the ATA serial number from the SATA identification string to generate an NAA identifier. The generated NAA identifier is then used by the process 112A to identify and exchange data with the storage device 130, beneficially allowing a SATA storage device 130A to appear as a different type of storage device 130, such as a SCSI storage device 130, to the process 112A.

In one embodiment, responsive to a process 112 generating a request to exchange data with a storage device 130A, the storage device controller 115 transmits an identification command, such as a SATA "ident" command, to the storage device 130A. Responsive to the identification command, the storage device 130A transmits its associated SATA identification string, or another identifier associated with the storage device 130A and having a first format, to the storage device controller 115. The storage device controller 115 performs the steps of the method described below in conjunction with FIG. 2 to generate a unique identifier having a specified format and identifying the storage device 130 for use by the process 112.

Generation of Formatted Unique Identifier

Figure 2:
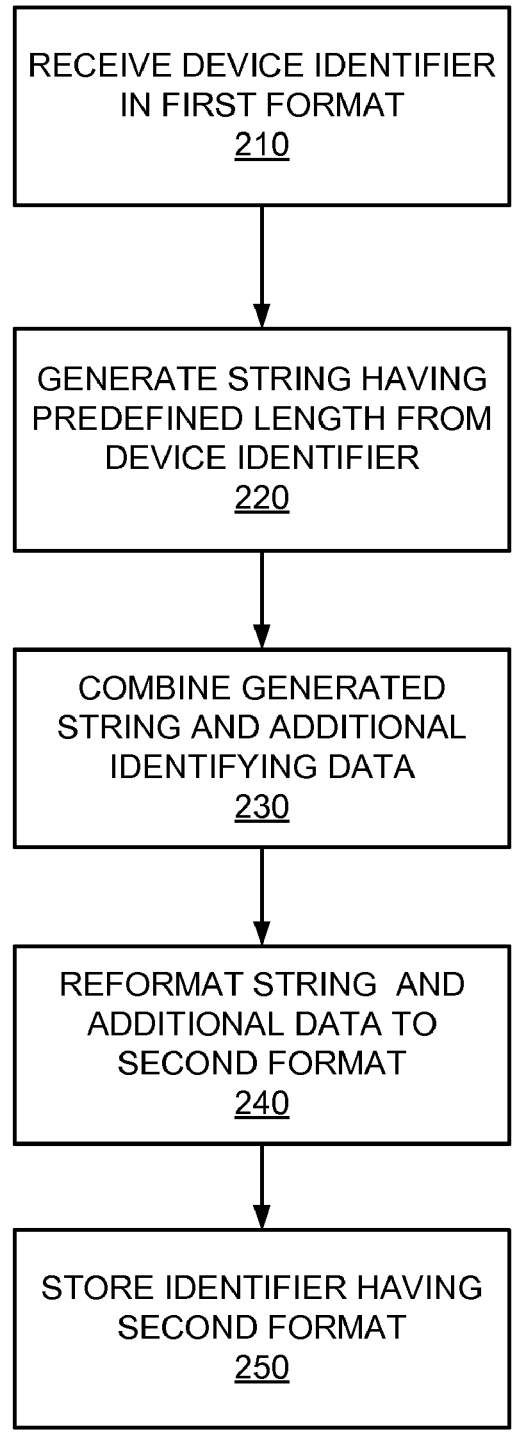
FIG. 2 is a flow chart of a method for generating a unique identifier having a specified format associated with a device according to one embodiment.

FIG. 2 shows an embodiment of a method 200 for generating a unique identifier having a specified format and identifying a device. In one embodiment, the steps depicted in the method 200 are implemented by instructions for performing the described actions embodied or stored within a computer readable storage medium, such as the memory 117 or the storage device controller 115, which are executable by a processor 111. Those of skill in the art will recognize that the method 200 may be implemented in embodiments of hardware and/or software or combinations thereof Moreover, other embodiments may include different and/or additional steps than the ones shown in FIG. 2. For purposes of illustration, the description of FIG. 2 describes generating a unique identifier where the NAA format is the specified format for identifying a SATA storage device 130 associated with an ATA serial number which identifies the disk in a first format. However, in other embodiments, different formats are used for the specified format and/or the first format of the identifier.

Initially, the storage device controller 115 receives 210 an identifier having a first format and associated with a storage device 130 via the network 120. For example, the storage device 130 is a SATA hard drive including a twenty-byte ASCII identification string including an ATA serial number. The ATA serial number associated with the storage device 130 is determined from the ASCII identification string and received 210 by the storage device controller 115. In one embodiment, the identifier having the first format is received 210 responsive to the storage device controller 115 transmitting an identification request, such as an ATA "ident" command, to the storage device 130.

Using the ATA serial number, the storage device controller 115 generates 220 a unique data string having a predefined length. The predefined length of the data string is dependent upon, or described by, a specified format used by a process 112 to identify or to access the storage device 130. For example, the process 112 uses an NAA identifier to uniquely identify the storage device 130, so the generated data string has a predefined length based on the parameters of the NAA format. For example, the data string has a three byte length to facilitate generation of an NAA identifier for use by the process 112 to identify and communicate with the storage device 130. In one embodiment, the predefined length string is generated 210 by applying a hash function to an ASCII string representing the received ATA serial number, producing a data string having a predefined length and uniquely identifying the storage device 130 associated with the ATA serial number.

In one embodiment, the hash function applied to the ATA serial number logically shifts the bits comprising the ATA serial number to the left by a specified amount for each byte of the ATA serial number. For example, the hash function left shifts a byte included in the ATA serial number by a shift amount. The shift amount is incremented after the byte is left-shifted and the left-shifted byte is added to an accumulator value from which the predefined length string is extracted. In one embodiment, the shift amount is incremented by two after a byte is left shifted and reset to zero if the shift amount exceeds a threshold Value.

For clarity, application of an example hash function to an ATA serial number is described. The example hash function first initializes an accumulator value to zero and initializes a shift amount to zero. The first byte of the ATA serial number is left shifted by the shift amount, which is initially zero, and added to the accumulator value. Hence, the first byte is not left-shifted and is added to the initial accumulator value of zero. The shift amount is then incremented by a specified amount, such as two, and the incremented shift amount is compared to a threshold value. In one embodiment, the threshold has a value of 8. If the incremented shift amount exceeds the threshold value, the shift amount is re-initialized to zero. The second byte of the ATA serial number is then left shifted by the shift amount, which is now two bits, and the left-shifted second byte is added to the accumulator value, adding the left-shifted second byte is added to the first byte of the ATA serial number. After incrementing the accumulator, the shift amount is again incremented and the incremented shift amount is compared to the threshold value. For example, the shift amount is incremented from two to four and the incremented shift amount is compared to the threshold value. The above-described steps are repeated for the remaining bytes in the ATA serial number, so various bytes of the ATA serial number are left-shifted by a different shift amount and the left-shifted bytes are used to increment an accumulator. The least-significant three bytes of the resulting accumulator are identified and used as the predefined length data string. In an alternative embodiment, an exclusive-OR operation is applied to the upper byte of the accumulator and the lower byte of the accumulator after each byte of the ATA serial number has been left-shifted and added to the accumulator. The least-significant three bytes of the value produced by the exclusive-OR operation are then identified and used as the predefined length string. In other embodiments, other hash functions producing a unique value having a predefined length are applied to the ATA serial number to generate 220 the predefined length string.

Additional identifying data is combined 230 with the predefined length string. In one embodiment, the additional identifying data includes a twenty-four-bit Organizationally Unique Identifier ("OUI") specifying a vendor, manufacturer or other entity generating the identifier having the specified format, or another entity. The OUI allocates a block of identifiers, including the generated identifier having the specified format, for use by the specified entity. In an embodiment, the additional identifying information also includes a type identifier indicating the specified format of the identifier, such as the format of an identifier used by a process 112 to identify the storage device 130. For example, the type identifier comprises a four-bit sequence where different combinations of bits identify different formats for data within the identifier.

The additional identifying information and the predefined length string are then reformatted 240 based on one or more formatting parameters associated with the specified format. In one embodiment, the one or more formatting parameters specify a data packet size and the location of various data types within the data packet. For example, to generate an NAA identifier, the one or more formatting parameters describe generation of an eight-byte data packet where the initial four bits of the data packet comprise the type identifier, three bytes of the data packet comprise the OUI and three bytes of the data packet comprise the predefined length string.

The eight-byte data packet is stored 250 and used by one or more processes to identify a storage device 130 with which data is exchanged.

Hence, the method 200 allows a storage device 130 including data uniquely identifying the storage device 130 in a first format to also be uniquely identified by a process 112 or computing device 110 using a different specified format to uniquely identify the storage device 130. For example, the method 200 allows generation of an NAA identifier which uniquely identifies a SATA storage device 130 to a process 112 or computing device 110 which uses SCSI commands to identify and communicate with a storage device 130. This beneficially increases the type and amount of storage devices 130 suitable for use with a process 112 or computing device 110.

Upon reading this disclosure, those of skill in the art will appreciate still additional alternative designs for a method for generating a unique identifier having a specified format from data having a different first format that is associated with a storage device. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A method for generating an identifier having a specified format and uniquely associated with a storage device, the method comprising:
    receiving, from the storage device, an identifier associated with the storage device and having a first format which differs from the specified format;
    generating a data string having a predefined length from the identifier associated with the storage device and having the first format, the predefined length of the string determined from the specified format;
    combining additional identification data with the data string having the predefined length;
    generating the identifier having the specified format by reformatting the additional identification data and the data string having the predefined length according to one or more formatting parameters associated with the specified format; and
    storing the identifier having the specified format in a computer-readable storage medium,
    wherein said generating the data string comprises applying a hash function to the identifier associated with the storage device and having the first format, and
    wherein said applying the hash function comprises:
        identifying a first byte of the identifier associated with the storage device and having the first format;
        logically shifting the first byte by a shift amount to produce a shifted first byte;
        adding the shifted first byte to an accumulator value;
        incrementing the shift amount by a specified value to generate an incremented shift amount;
        identifying a second byte of the identifier;
        logically shifting the second byte by the incremented shift amount to produce a shifted second byte; and
        adding the shifted second byte to the accumulator value.

2. The method of claim 1 wherein the identifier associated with the storage device and having the first format which differs from the specified format comprises an AT Attachment ("ATA") serial number.

3. The method of claim 1 wherein the identifier having the specified format comprises a Network Address Authority ("NAA") identifier.

4. The method of claim 1, wherein incrementing the shift amount by the specified value to generate the incremented shift amount comprises:
   responsive to the incremented shift amount exceeding a threshold value, initializing the incremented shift amount to an initial value.

5. The method of claim 1, further comprising:
   generating the data string having the predefined length from a subset of the accumulator.

6. The method of claim 5, wherein the subset of the accumulator comprises a least-significant three bytes of the accumulator.

7. The method of claim 6, wherein the subset of the accumulator comprises a least-significant three bytes of the accumulator.

8. The method of claim 1, further comprising:
   identifying an upper byte of the accumulator;
   identifying a lower byte of the accumulator;
   generating a modified lower byte by performing an exclusive-OR of the upper byte and the lower byte; and
   generating the data string having the predefined length from a subset of the accumulator and the modified lower byte.

9. The method of claim 1, wherein the additional identification data comprises an Organizationally Unique Identifier ("OUI") associated with an entity.

10. The method of claim 1, wherein the additional identification data comprises a type identifier associated with the specified format.

11. The method of claim 1, wherein reformatting the additional identification data and the data string having the predefined length according to one or more formatting parameters associated with the specified format comprises:
    generating a data packet having a specified packet size and including specified data types.

12. The method of claim 11, wherein the specified packet size comprises eight bytes, and the specified data types comprise an Organizationally Unique Identifier, a type identifier associated with the specified format and the data string having the predefined length.

13. A computer readable storage medium storing a computer program product including instructions executable by a processor of a computing device to perform a computer-implemented method for generating an identifier having a specified format and uniquely associated with a storage device, the method comprising:
    receiving, from the storage device, an identifier associated with the storage device and having a first format which differs from the specified format;
    generating a data string having a predefined length from the identifier associated with the storage device and having the first format, the predefined length of the string determined from the specified format;
    combining additional identification data with the data string having the predefined length;
    generating the identifier having the specified format by reformatting the additional identification data and the data string having the predefined length according to one or more formatting parameters associated with the specified format; and
    storing the identifier having the specified format in a computer-readable storage medium,
    wherein said generating the data string comprises applying a hash function to the identifier associated with the storage device and having the first format, and
    wherein said applying the hash function comprising
       identifying a first byte of the identifier associated with the storage device and having the first format;
       logically shifting the first byte by a shift amount to produce a shifted first byte;
       adding the shifted first byte to an accumulator value;
       incrementing the shift amount by a specified value to generate an incremented shift amount;
       identifying a second byte of the identifier;
       logically shifting the second byte by the incremented shift amount to produce a shifted second byte; and
       adding the shifted second byte to the accumulator value.

14. The computer readable storage medium of claim 13, wherein the identifier associated with the storage device and having the first format which differs from the specified format comprises an AT Attachment ("ATA") serial number.

15. The computer readable storage medium of claim 13, wherein the identifier having the specified format comprises a Network Address Authority ("NAA") identifier.

16. The computer readable storage medium of claim 13, wherein incrementing the shift amount by the specified value to generate the incremented shift amount comprises:
    responsive to the incremented shift amount exceeding a threshold value, initializing the incremented shift amount to an initial value.

17. The computer readable storage medium of claim 16, further comprising:
    generating the data string having the predefined length from a subset of the accumulator.

18. The computer readable storage medium of claim 13, wherein the additional identification data comprises an Organizationally Unique Identifier ("OUI") associated with an entity.

19. The computer readable storage medium of claim 13, wherein the additional identification data comprises a type identifier associated with the specified format.

20. The computer readable storage medium of claim 13, wherein reformatting the additional identification data and the data string having the predefined length according to one or more formatting parameters associated with the specified format comprises:
    generating a data packet having a specified packet size and including specified data types.

21. The computer readable storage medium of claim 20, wherein the specified packet size comprises eight bytes, and the specified data types comprise an Organizationally Unique Identifier, a type identifier associated with the specified format and the data string having the predefined length.

* * * * *